United States Patent
Berg et al.

(10) Patent No.: US 7,792,851 B2
(45) Date of Patent: Sep. 7, 2010

(54) MECHANISM FOR DEFINING QUERIES IN TERMS OF DATA OBJECTS

(75) Inventors: Daniel Christopher Berg, Cary, NC (US); Narinder Makin, Morrisville, NC (US); Lawrence Scott Rich, Cary, NC (US); Ritchard Leonard Schacher, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 217 days.

(21) Appl. No.: 11/002,740

(22) Filed: Dec. 2, 2004

(65) Prior Publication Data

US 2006/0122973 A1    Jun. 8, 2006

(51) Int. Cl.
G06F 7/00 (2006.01)
G06F 17/30 (2006.01)

(52) U.S. Cl. ............... 707/759; 707/769; 707/722; 717/108

(58) Field of Classification Search ............ 707/3, 707/999.003, 999.004, 999.005
See application file for complete search history.

(56) References Cited

U.S. PATENT DOCUMENTS

| | | | | |
|---|---|---|---|---|
| 5,446,886 A * | 8/1995 | Li | | 707/2 |
| 5,721,900 A * | 2/1998 | Banning et al. | | 707/4 |
| 6,266,666 B1 | 7/2001 | Ireland et al. | | |
| 6,341,277 B1 * | 1/2002 | Coden et al. | | 707/2 |
| 6,477,527 B2 * | 11/2002 | Carey et al. | | 707/4 |
| 6,484,180 B1 * | 11/2002 | Lyons et al. | | 707/103 R |
| 6,539,396 B1 | 3/2003 | Bowman-Amuah | | |
| 6,574,639 B2 * | 6/2003 | Carey et al. | | 707/104.1 |
| 6,609,123 B1 * | 8/2003 | Cazemier et al. | | 707/4 |
| 6,618,732 B1 * | 9/2003 | White et al. | | 707/103 R |
| 6,675,227 B1 | 1/2004 | Gavrilo et al. | | |
| 6,690,820 B2 | 2/2004 | Lees et al. | | |
| 6,850,927 B1 * | 2/2005 | Hsu | | 707/2 |
| 6,957,214 B2 * | 10/2005 | Silberberg et al. | | 707/4 |
| 6,999,956 B2 * | 2/2006 | Mullins | | 707/2 |
| 7,082,433 B2 * | 7/2006 | Anonsen et al. | | 707/100 |
| 7,103,600 B2 * | 9/2006 | Mullins | | 707/10 |

(Continued)

OTHER PUBLICATIONS

Berg et al., Method and Apparatus for Annotation-Based Behavior Extensions, Dec. 2, 2004.

(Continued)

*Primary Examiner*—Hosain T Alam
*Assistant Examiner*—Shew-Fen Lin
(74) *Attorney, Agent, or Firm*—Joseph E. Bracken; Law Office of Jim Boice

(57) ABSTRACT

A method, apparatus, and computer instructions for defining queries in terms of data objects. A simplified query syntax is introduced for querying across a set of data objects which does not require the duplication of data object shape information. A data object is first defined by providing a name for the data object. Attribute and relationship information is added to the data object, wherein the information defines the shape of the data object. When a query is created, it is defined in terms of data objects. The query is processed, wherein processing the query includes extracting the shape of the data objects using the attribute information in the query. The query is expanded by adding additional syntax to the query based on relationship information defined for the data objects and then executed in its expanded form.

18 Claims, 6 Drawing Sheets

U.S. PATENT DOCUMENTS

| | | |
|---|---|---|
| 7,222,333 B1 | 5/2007 | Mor et al. |
| 2002/0049788 A1 | 4/2002 | Lipkin et al. |
| 2003/0018701 A1 | 1/2003 | Kaestle et al. |
| 2003/0046673 A1 | 3/2003 | Copeland et al. |
| 2003/0051063 A1 | 3/2003 | Skufca et al. |
| 2003/0135509 A1 | 7/2003 | Davis et al. |
| 2003/0182307 A1 | 9/2003 | Chen et al. |
| 2004/0054569 A1 | 3/2004 | Pombo et al. |
| 2004/0060007 A1* | 3/2004 | Gottlob et al. .............. 715/513 |
| 2004/0158549 A1 | 8/2004 | Matena et al. ................. 707/1 |
| 2005/0066338 A1 | 3/2005 | Bloesch et al. |
| 2006/0061595 A1 | 3/2006 | Goede et al. |
| 2007/0192336 A1* | 8/2007 | Iyer et al. ................... 707/100 |

OTHER PUBLICATIONS

Berg et al., Method and Apparatus for Incrementally Processing Program Annotations, Dec. 2, 2004.

Berg et al., Method and Apparatus for Generating a Service Data Object Based Service Pattern for an Enterprise Java Beans Model, Dec. 2, 2004.

"Core J2EE Patterns—Data Access Object", Sun Microsystems, Inc., http://java.sun.com/blueprints/corej2eepatterns/Patterns/DataAccessObject.html, pp. 1-13.

* cited by examiner

FIG. 6

650 { [select {$ DO} as alias where alias , property operator parameter ]

660 { [select in ( alias , role ) as roleAlias where roleAlias , property operator parameter ]

702 { SELECT d.department_id, d.name, e.employee_id, e.ssn, e.firstName, e.lastName, e.dateOfBirth, a.address_id, a.street1, a.street2, a.city, a.zip from Department as d where d.name='Rational' —710 ⟶708

704 { INNER JOIN Employee as e ON d.department_id=e.department+id AND e.firstName='Joe' ⟶712

706 { INNER JOIN Address as a ON e.address_id=a.address_id ⟶714

718 Assumption: ?1 = 'Rational'

722 - [select {$Department} as d where d.name=?1]
         728   730   732   734  736

802 — SELECT d.department_id, d.name, e.employee_id, e.ssn, e.firstName, e.lastName, e.dateOfBirth, a.address_id, a.street1, a.street2, a.city, a.zip from Department as d where d.name='Rational' — 810 ⟶808

804 — INNER JOIN Employee as e ON d.department_id=e.department_id AND e.firstName='Joe' ⟶812

806 — INNER JOIN Address as a ON e.address_id=a.address_id AND a.zip='27560' ⟶814

FIG. 8B

818 Assumption: ?1 = 'Rational',?2='Joe',?3='27560'   820

822 - [select {$Department} as d where d.name=?1],
         828   830   832   834  836

824 - [select in (d.employees) as e where e.firstName=?2],
         832   850   842                           844
              840

826 - [select in (e.address) as a where a.zip=?3]
         852   854                856

FIG. 8C 860
       870
862 — [select {$Department} as d where d.name=?1],
                                                      878
            866
864 — [select in (d.employees) as e where e.firstName=?2 and e.address.zip=?3]
         868   872                     874            876

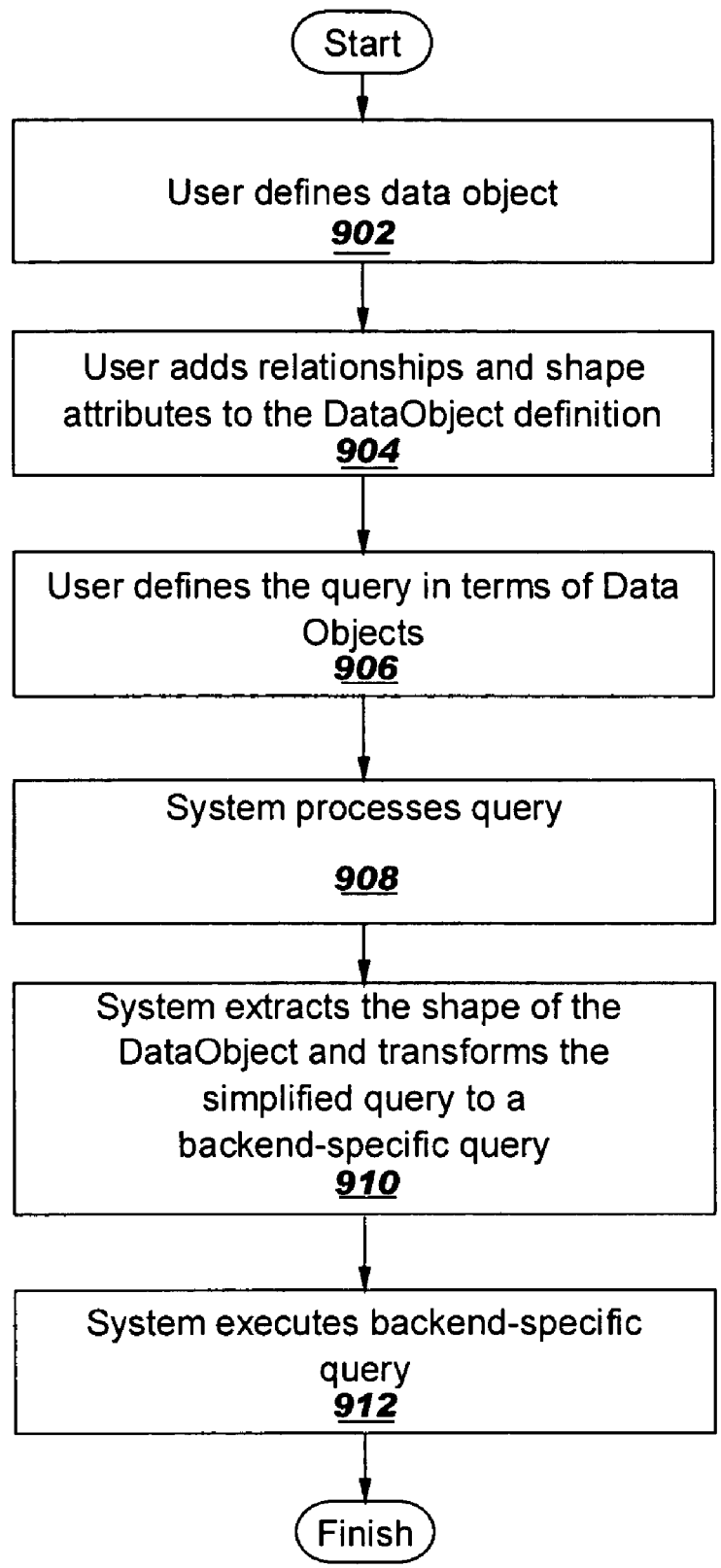

MECHANISM FOR DEFINING QUERIES IN TERMS OF DATA OBJECTS

RELATED APPLICATIONS

The present invention is related to the following applications entitled "Method and Apparatus for Annotation-Based Behavior Extensions", Ser. No. 11/002,833, filed on Dec. 2, 2004; "Method and Apparatus for Incrementally Processing Program Annotations", Ser. No. 11/002,845, filed on Dec. 2, 2004; and "Method And Apparatus For Generating a Service Data Object Based Service Pattern for an Enterprise Java Beans Model", Ser. No. 11/001,864, filed on Dec. 2, 2004. All of the above related applications are assigned to the same assignee, and incorporated herein by reference.

BACKGROUND OF THE INVENTION

1. Technical Field

The present invention relates generally to an improved data processing system. In particular, the present invention relates to a method, apparatus, and computer instructions for defining queries in terms of named data objects.

2. Description of Related Art

Object-oriented programming techniques involve the definition, creation, use, and instruction of "objects". These objects are software entities comprising data elements or attributes and methods, which manipulate data elements. Objects also may include data related to events outside of the object to trigger or control methods within the object.

Data objects modeled in an object-oriented system typically represent data from a backend data store. In the current art, several methods exist to construct and populate data objects. One such method includes modeling data objects to represent lightweight constructs. These lightweight constructs contain data from Entity Enterprise Java Beans (EJBs). Another existing method to construct and populate data objects includes using an object model where data objects represent rows in tables in a relational database. In this particular implementation, the "class" of the data object models the shape from the database table, and instances of the data object represent individual rows from the table.

Data objects reference other data objects, and collectively compose a "data graph". A data graph is a collection of tree-structured or graph-structured data objects. Applications typically define data sources which can be used by mediators for fetching data, constructing, populating, and linking data objects, and returning a data graph. A mediator carries out the backend specific details of retrieving and storing the data requested by the application. For example, one might have an Enterprise JavaBeans (EJB) mediator, a Java Database Connectivity (JDBC) mediator, or an Extensible Markup Language (XML) mediator, etc.

Regardless of the specific mediator service utilized, a mediator requires information concerning the "shape" of the data in order to know how to perform a query. The shape can be described as the attributes, or fields of an object, and the references, or relationships, it contains to other objects. The shape of the object is used to generate a query, whose "shape" is defined by the column values to be retrieved. For example, a JDBC mediator might be given a Structured Query Language (SQL) string, such as "Select a.street, a.city, a.state, a.zip from address as a", in order to fetch a list of addresses from the database and construct "AddressLite" data objects, with named attributes "street", "city", "state", and "zip".

The problem with existing art is that the shape of the data is defined in two places. Using a meta-model based framework for modeling data objects, the shape of a data object is implicitly defined in the meta-model. For example, the meta-model for AddressLite implicitly knows its shape. However, a separate corresponding query string, which also contains the data shape in the form of named table columns, is passed to the mediator to perform the data retrieval. If any field or reference is added to, removed from, or otherwise modified in the AddressLite data object, the corresponding query also requires modification. The example presented above is simple; however, for complex queries with complex data models that include many relationships between objects, the maintenance also becomes quite complex and thus is very prone to becoming "out-of-sync". Thus, providing the data shape in two places is clearly redundant, maintenance intensive, and error prone.

Therefore, it would be advantageous to have a mechanism for defining queries that does not require the duplication of data shape information.

BRIEF SUMMARY OF THE INVENTION

The present invention provides a method, apparatus, and computer instructions for defining queries in terms of data objects. The mechanism of the present invention introduces a simplified query syntax for querying across a set of data objects which does not require the duplication of data object shape information. Consequently, modifications to the shape of a data object do not require any modifications to defined data object queries in terms of shape. A data object is first defined by providing a name for the data object. Attribute and relationship information is added to the data object, wherein the attribute and relationship information defines the shape of the data object. When a query is created, it is defined in terms of data objects. The query is processed, wherein processing the query includes extracting the shape of the data objects using the meta-model information for the data object. The query is then expanded by adding additional syntax to the query based on relationship information defined for the data objects. The query is then executed in its expanded form.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 6 depicts the basic structure of a data object based query syntax in accordance with a preferred embodiment of the present invention;

FIG. 7A is an example ANSI SQL query;

FIG. 7B is an exemplary defined data object query in accordance with a preferred embodiment of the present invention for the ANSI SQL query depicted in FIG. 7A;

FIG. 8A is an example ANSI SQL query;

FIG. 8B is an exemplary data object query in accordance with a preferred embodiment of the present invention for the ANSI SQL query depicted in FIG. 8A;

FIG. 8C is an exemplary data object query in accordance with a preferred embodiment of the present invention for the ANSI SQL query depicted in FIG. 8A; and FIG. 9 is a flowchart of the process for defining queries in terms of data objects in accordance with a preferred embodiment of the present invention.

DETAILED DESCRIPTION OF THE INVENTION

Figure 1:
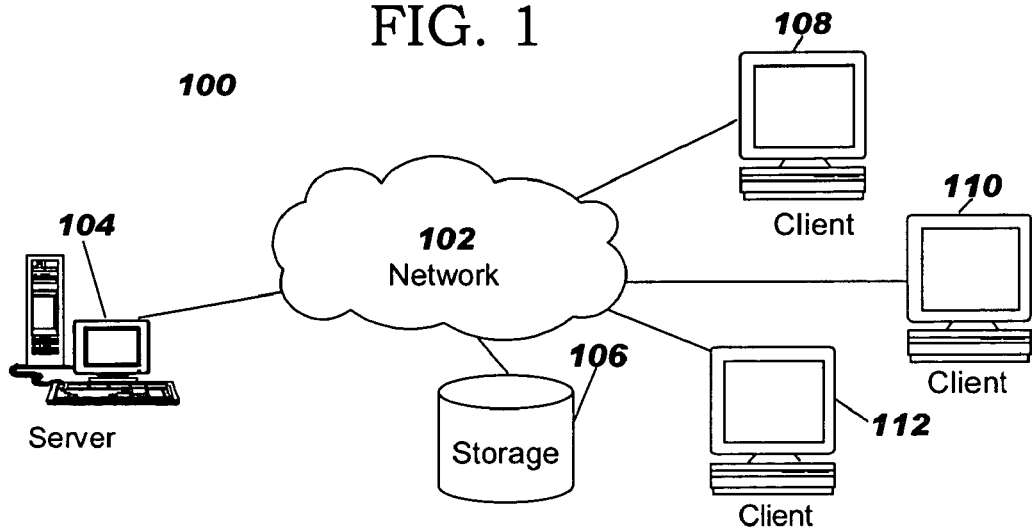
FIG. 1 depicts a representation of a network of data processing systems in which the present invention may be implemented.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. Storage unit 106 may maintain a relational database, for example, which stores its data inside tables. In addition, clients 108, 110, and 112 are connected to network 102. These clients 108, 110, and 112 may be, for example, personal computers or network computers. In the depicted example, server 104 provides data, such as boot files, operating system images, and applications to clients 108-112. Clients 108, 110, and 112 are clients to server 104. Network data processing system 100 may include additional servers, clients, and other devices not shown. In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
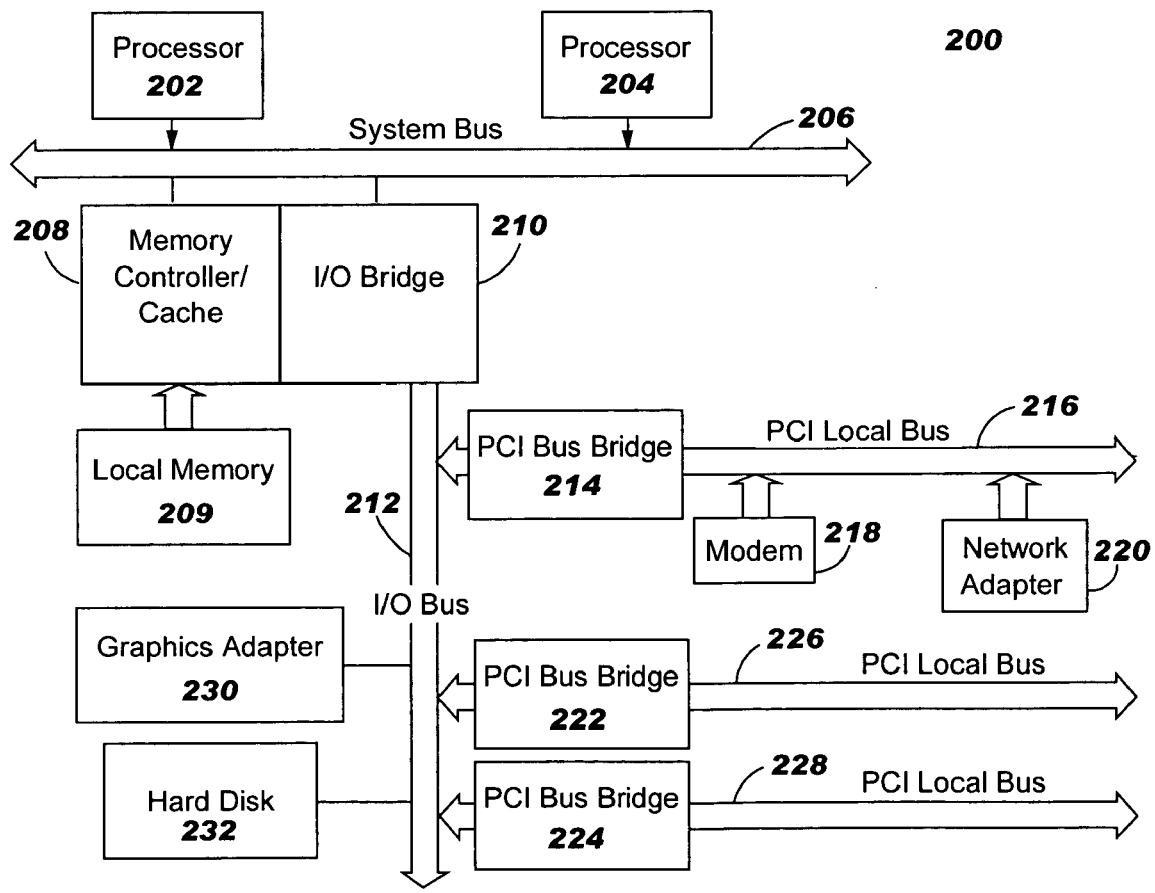
FIG. 2 is a block diagram of a data processing system that may be implemented as a server in accordance with a preferred embodiment of the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O Bus Bridge 210 is connected to system bus 206 and provides an interface to I/O bus 212. Memory controller/cache 208 and I/O Bus Bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108-112 in FIG. 1 may be provided through modem 218 and network adapter 220 connected to PCI local bus 216 through add-in connectors.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM eServer pSeries system, a product of International Business Machines Corporation in Armonk, N.Y., running the Advanced Interactive Executive (AIX) operating system or LINUX operating system.

Figure 3:
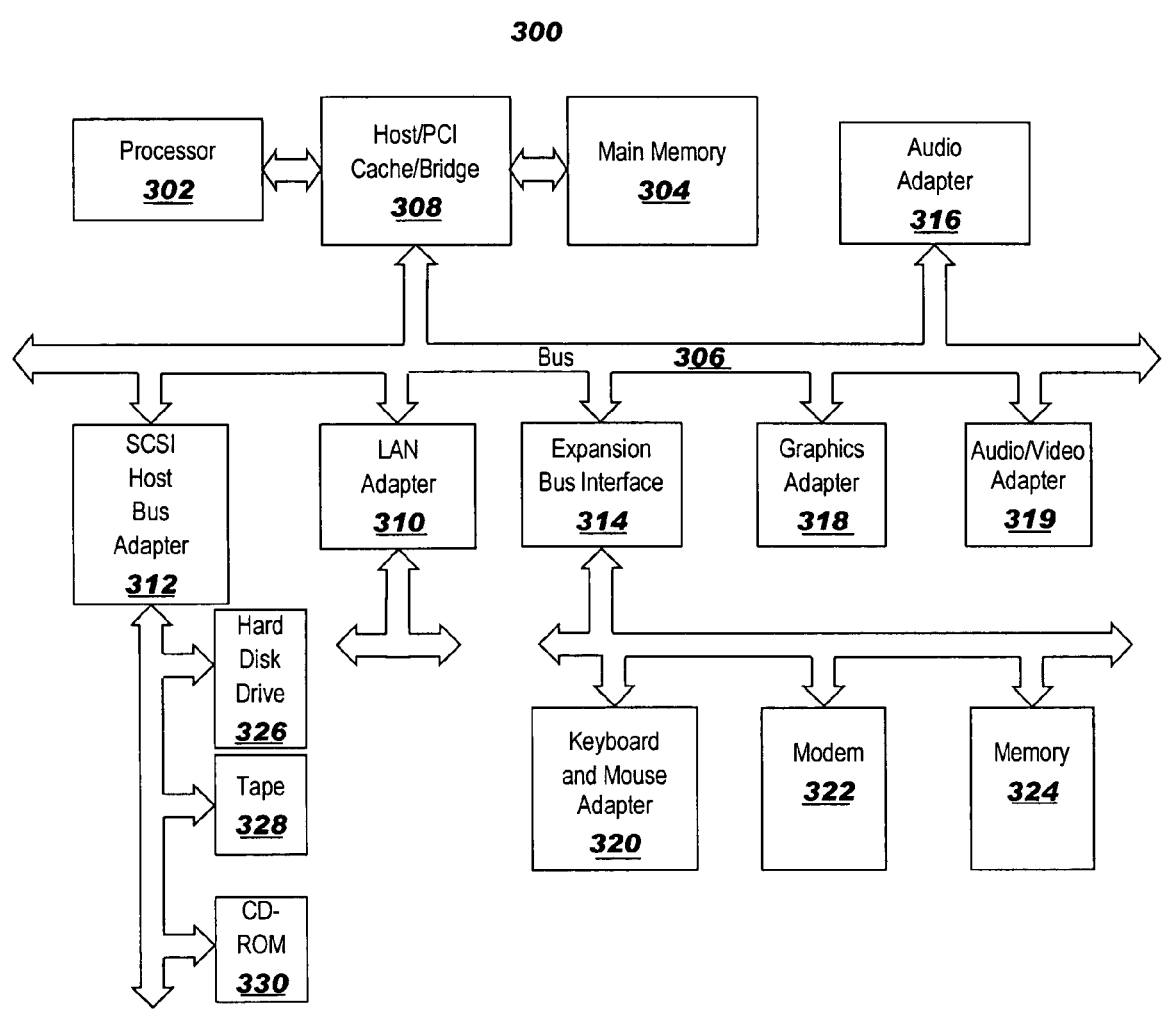
FIG. 3 is a block diagram illustrating a data processing system in which a preferred embodiment of the present invention may be implemented.

With reference now to FIG. 3, a block diagram illustrating a data processing system is depicted in which a preferred embodiment of the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI Bridge 308. PCI Bridge 308 also may include an integrated memory controller and cache memory for processor 302. Additional connections to PCI local bus 306 may be made through direct component interconnection or through add-in boards. In the depicted example, local area network (LAN) adapter 310, small computer system interface (SCSI) host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. SCSI host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows XP, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented programming system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash read-only memory (ROM), equivalent nonvolatile memory, or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interfaces As a further example, data processing system 300 may be a personal digital assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

With a persistence data store, data is manipulated using a specific query language for the database implementation. For example, relational databases typically utilize SQL code to retrieve values from database tables in the database. In contrast with existing query methods which define queries in terms of underlying table columns, the present invention provides a method, apparatus, and computer instructions for defining queries in terms of data objects. The mechanism of the present invention introduces a simplified query syntax for querying across a set of data objects. In this simplified query syntax, data object names are "inlined" into the query string. The data objects represent a projection of the table shape in a back-end data store. That is, the data object attributes represent a subset of the table columns. Using the data object names in the query allows for the system to derive the shape of the backend specific query from the shape of the data object. Either through a preprocessing step or, alternatively, at runtime, the simplified query is expanded to an actual query, wherein the actual query is derived from the data object meta-model. A meta-model is a model containing information, such as the shape of the data objects, which describes the model. By defining queries in terms of data objects, there is no need to define the shape of the query in two places. Thus, modifications to the shape of the referenced data objects do not require any modifications to user-specified queries in terms of shape.

The shape of a data object is defined by the attribute and relationship information of the data object. A user defines a data object by providing a name for the object, and then defines the shape of the data object by adding attribute and relationship information to the data object. With the present invention, a user defines a query in terms of the data object. Based on the data object, the system extracts the shape of the data object using the attribute information in the meta-model, and then uses this information to transform the simplified query into the backend specific query. Once the simplified syntax is expanded into the actual query syntax, the system executes the backend specific query.

In the case of "deep" data objects, or data objects that reference other data objects, the simplified data object query is expanded into multiple SQL statements that perform joins as necessary. In this manner, complex join queries may be generated by default based on data object associations in the meta-model. Union queries may be also generated from a set of discreet query strings to compose a data graph of heterogeneous object roots.

It should be noted that the present invention assumes the existence of a mapping meta-model within the system. This mapping meta-model either describes the mapping of data objects to the back-end data store or maps the back-end data store to some intermediate modeled objects (e.g., entity EJBs) from which the data objects are derived. The simplified query syntax is expanded to full form using this mapping meta-model.

Figure 4:
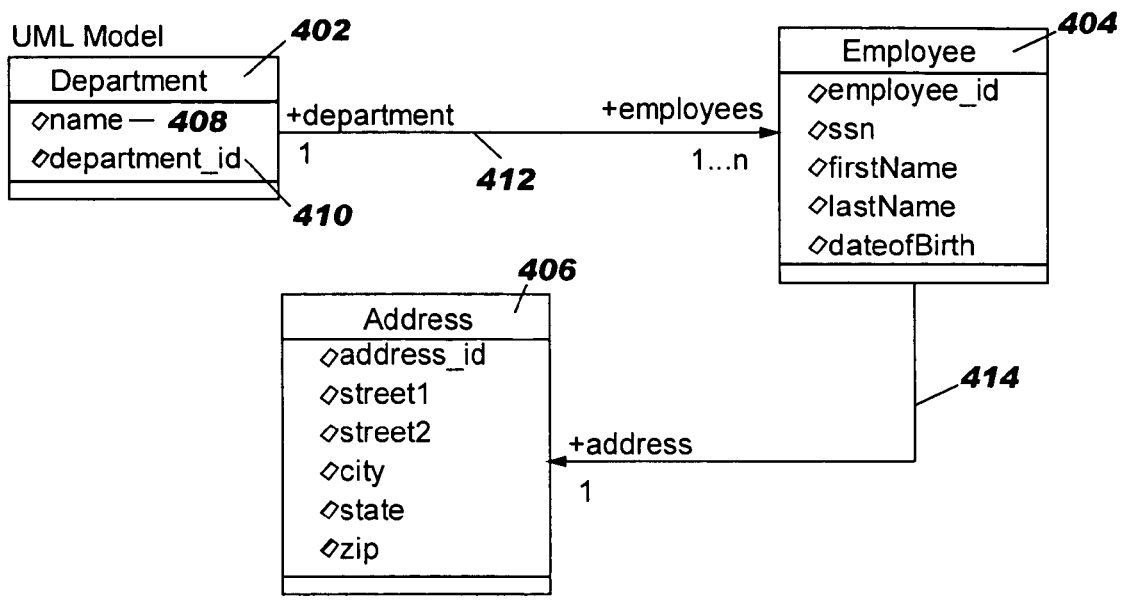
FIG. 4 is an exemplary Unified Modeling Language (UML) diagram of an exemplary data object model in accordance with the present invention.

FIG. 4 is an exemplary UML diagram in accordance with the present invention. UML diagram 400 illustrates an example model of data objects in a system. In particular, UML diagram 400 shows three data objects. The top pane in each object box represents the name of the data object, such as, for example, Department object 402, Employee object 404, and Address object 406. The middle pane in each object box represents the list of attributes (also known as "fields") of the data object. An attribute has a name and a type. For simplicity, only the names are shown. For example, department object 402 has a "name" attribute 408 and a "department_id" 410 attribute.

Associations between the data objects in UML diagram 400 are shown by association arrows 412 and 414. Association arrows are used to represent a reference or relationship between two objects. An association contains either one or two roles representing each potential direction of the association. For example, association arrow 412 illustrates a relationship from department object 402 to employee object 404, with role name "employees". Each department has one or more employee (1 . . . n), while each employee is a member of one department (1). Similarly, association arrow 414 illustrates a relationship from employee object 404 to address object 406, with role name "address". Each employee is shown to have one address (1).

Figure 5:
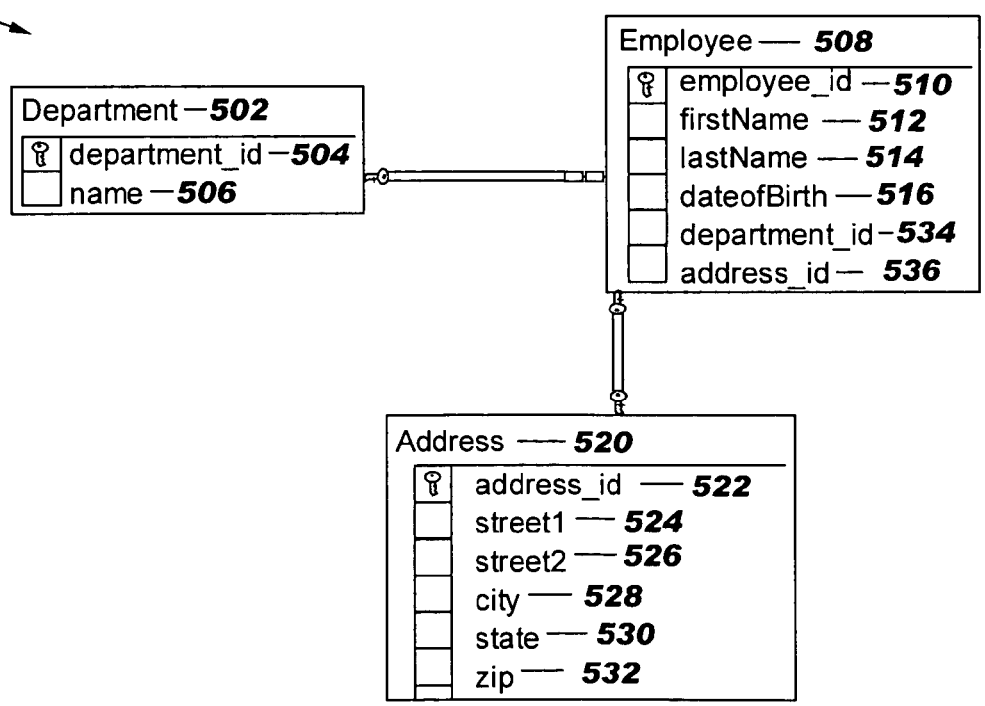
FIG. 5 is an example Entity Relationship (ER) diagram of database tables in accordance with the present invention that correspond to the objects in the UML model depicted in FIG. 4.

FIG. 5 is an example ER diagram in accordance with the present invention. ER diagram 500 illustrates an example "real world" data object model. The model represented by ER diagram 500 may be implemented in a data processing system, such as data processing systems 200 and 300 shown in FIGS. 2 and 3.

ER diagram 500 shows department table 502, employee table 508, and address table 520 representing tables of data in a relational database. Tables in a database can be related to each other with keys, such as a primary key which is a column in the table with a unique value for each row. A foreign key is a set of columns that match in size, order, and type to the columns in the primary key of another table. It is used to establish and enforce links between data in two tables. The purpose of the keys is to bind data together, across tables, without repeating all of the data in every table. For example, Department table 502 is shown to contain columns department_id 504 and name 506, where department_id 504 is a primary key column. Employee table 508 contains various columns, including employee_id 510, firstName 512, lastName 514, dateOfBirth 516, department_id 534, and address_id 536, where employee_id 510 is a primary key column. Address table 520 also contains various columns, including address_id 522, street1 524, street2 526, city 528, state 530, and zip 532, wherein address_id 522 is a primary key column. Department_id 534 in Employee table 508 is a foreign key column pointing to the primary key column department_id 504 of Department table 502. Likewise, address_id 536 in Employee table 508 is a foreign key column pointing to the primary key column address_id 522 in Address table 520.

As shown, each employee has an associated department_id 504, specifying the ID of the particular department in which an employee works. The relationship between department table 502 and employee table 508 is a one-to-many relationship. Thus, multiple employees may be associated with a single department, and only one department is associated with each employee. Similarly, each employee has an associated address ID 522, specifying the employee's address. The relationship between employee table 508 and address table 520 is a one to one relationship. Each employee is associated with a single address, and each address is associated with a single employee.

Turning now to FIG. 6, the basic structure of a data object based query syntax is depicted in accordance with a preferred embodiment of the present invention. As mentioned previously, the mechanism of the present invention allows a user to express a query in terms of data objects. This data object query is then parsed and transformed into an expanded SQL query at runtime or during compilation. Note that the data object query is not limited to being transformed into a SQL query. Other query languages, such as Enterprise Java Bean (EJB) query language (QL), may be used. In addition, the query syntax shown in FIG. 6 may be used to express a query in terms of the example data objects in FIG. 4, and transformed to form a query against the database tables in FIG. 5.

A data object query, such as one using the syntax 600, is composed of one or more query "segments". These segments are denoted and enclosed by opening and closing square brackets "[ ]". As illustrated, data object query 600 is comprised of two segments, 650 and 660. Data object query 600 also includes boxed items and unboxed items. The unboxed items represent literal strings, and the boxed items represent variables to be replaced with actual values in the user defined query in terms of the data objects. These values will then further be parsed and used by the system for a full SQL query transformation.

In this illustrative example, each data query segment begins with the term "SELECT" (602 and 620). Those skilled in the art will appreciate that the syntax is like SQL, where a SELECT statement is used to select data. The first query segment 650 in data object query 600 should contain a reference to a top level or "root" data object 604 from which the actual transformed SQL query is derived. As shown, named data object 604 is enclosed in curly brackets, with a '$' preceding the named data object. This special syntax is used to denote the data object substitution. Named data object 604 is followed by "as" keyword 606, which is in turn followed by unique alias 608, or short name, for named data object 604.

"Where" clause 609 is optionally included after unique alias 608 and begins with "where" keyword 610. "Where" clause expression 609 is used to determine whether the text in "where" clause expression 609 evaluates to "true" or "false". It should be noted that if "where" keyword 609 is unspecified in a segment, then no text should follow unique alias 608. In other words, "where" clause 609 is included in a segment only if there is text following "where" keyword 610.

Within "where" clause 609, alias 612 is the same value as alias 608 and is used to represent named data object 604. Property 614 follows alias 612 and is used to represent a property of named data object 604 whose type is a simple data type. Property 614 may be a simple attribute on named data object 604, or a property on a referenced data object. Thus, a property may be defined as: (role.)*attribute, where each role can only have a multiplicity of 1. If the multiplicity of a role is many, then the syntax in segment 660 must be used when additional filtering based on attributes in the object referenced by the role is desired. Comparison operator 616, such as, for example, "=", is included after property 614. Parameter 618 for property 614 is a variable that can be substituted with an actual value at runtime or during compilation. Parameter 618 has a structure of ?1, ?2, ?3, etc., where each parameter is unique.

Second query segment 660 contains items that are selected from a previously referenced data object in the query. Additional query segments such as second query segment 660 are optional and may be used when more filtering is required in the query. Second query segment 660 comprises syntax for additional filtering using a data object associated with another data object from a preceding query segment.

Like first query segment 650, second query segment 660 begins with the term "select" 620. However, "in" keyword 622 indicates that a referenced data object follows. In place of named data object 604 in first query segment 650, second query segment 660 includes alias 624 for referenced data object 604 used in first query segment 650. Second query segment 660 also includes association role 626 from referenced data object 604 corresponding to alias 624. Alias 624 and association role 626 are enclosed in parentheses. Association role 626 is followed by "as" keyword 628, which is in turn followed by roleAlias 630, or unique alias name, for referenced data object 604.

If "where" clause 631 is included after roleAlias 630, roleAlias 634 is used to represent roleAlias 630 used previously in second query segment 660. Property 636, comparison operator 638, and parameter 640 follow roleAlias 634 in "where" clause 631.

As shown above, a query may be expressed in terms of the root data object. In this instance, the root object is Department object 604. The root object is used to introspect on the data model, such as data model 400 in FIG. 4, in order to define the remainder of the query based on the nested objects. Thus, complex join queries can be generated by default based on data object associations in the meta-model.

FIGS. 7A-7B provide an example illustrating how the mechanism of a preferred embodiment of the present invention allows for simplifying the query syntax by expressing a query in terms of named data objects. In particular, FIG. 7A illustrates an example American National Standards Institute (ANSI) SQL query 700. SQL query 700 comprises a SELECT statement 702 and two INNER JOINs 704, 706. SELECT statement 702 is shown to request data from the Department 708 table, where the department name is "Rational" 710. The information requested includes the department name and ID, IDs, social security numbers, names, and date of birth of employees associated with the department, and the addresses for those employees associated with the department.

As the data requested includes data located in more than one table, SQL query 700 also includes two inner joins. An inner join is a relational database operation that selects rows from two tables, such that the values from the primary key columns of the first table equal the values of a set of foreign key columns of the second table. In this example, INNER JOIN 704 is used to return all rows from Employee 712 table, wherein there is a match between the value in the department_id in Department 708 table and the value in the department_id in Employee 712 table. INNER JOIN 706 is used to return all rows from Address 714 table, wherein there is a match between the value in the address_id in Address 714 table and the value in the address_id in Employee 712 table.

In contrast with the SQL query in FIG. 7A, FIG. 7B is an exemplary defined data object query in accordance with the present invention. The data object query in FIG. 7B is simplified, wherein the data object names are "inlined" into the query string to represent the shape of the query. In a preprocessing step or at runtime, the simplified data object query is transformed into a SQL statement (or multiple SQL statements, depending upon whether the data objects in the query contain associations to other data objects, or if the query contains heterogeneous set of data objects).

Query 720 in FIG. 7B is shown to contain one query segment, segment 722. Prior to executing query 720, parameters 718 is defined for the first parameter value (i.e., "?1") of the query. For example, parameter "?1" is given a value of "Rational".

As previously described in FIG. 6, query segment 722 begins with SELECT keyword 728 and contains a reference to the root data object (Department object 730) from which the actual transformed SQL query is derived. "d" 732 is used as the alias for Department object 730. As shown in the "where" clause, query segment 722 returns department information where department name 734 is equal to the value in parameter 736. In this example, the name of the first parameter 736 is "?1", which was previously given a value of "Rational" in parameters 718. Query segment 722 also returns Employee and Address information, such as IDs, social security numbers, names, dates of birth, and the addresses for those employees in the "Rational" department, as the Department data object has an association named "employees" which is typed to a collection of Employee data objects and the Employee data object has an association named "addresses" which is typed to a collection of Address data objects. Thus, query segment 722 may be used to derive the query result illustrated in FIG. 7A. Additional query segments are needed in query 720 only if further filtering or sorting is necessary (i.e., WHERE or ORDER BY clause statements are required for Employee data and/or Address data).

FIGS. 8A-8C provide other examples of an ANSI SQL query and corresponding simplified data object queries in accordance with a preferred embodiment of the present invention. FIG. 8A illustrates a SQL query similar to SQL query 700 in FIG. 7A, but SQL query 800 in FIG. 8A requests all employee and employee address information for those employees in the "Rational" department with the name "Joe", and who live in the "27560" zip code.

SELECT statement 802 is shown to request data from the Department 808 table, where the department name is "Rational" 810. SQL query 800 also includes two inner joins. INNER JOIN 804 is used to return all rows from Employee 812 table, where there is a match between the value in the department_id in Department 808 table and the value in the department_id in Employee 812 table, and where the first name of the employee is "Joe". INNER JOIN 806 is used to return all rows from Address 814 table, where there is a match between the value in the address_id in Address 814 table and the value in the address_id in Employee 812 table and where the zip is "27560".

Query 820 in FIG. 8B is shown to contain three query segments, 822, 824, and 826. Prior to executing query 820, parameters 818 are defined for selected values in the tables. For example, parameter "?1" is given a value of "Rational", parameter "?2" as "Joe", and parameter "?3" as "27560".

First query segment 822 begins with SELECT keyword 828 and contains a reference to the root data object (Department object 830) from which the actual transformed SQL query is derived. "d" 832 is used as the alias for Department object 830. As shown in the "where" clause, first query segment 822 returns department, employee, and employee address information where department name 834 is equal to the value in parameter 836. In this example, the name of the first parameter 836 is "?1", which was previously given a value of "Rational" in parameters 818.

With complex queries, the root data object (Department) in first query segment 822 is used to define the entire shape of the query based on the nested objects (Employee and Address). Second query segment 824 contains items selected from a previously referenced data object in the query and it is used to further filter the results of the query based on attributes from the Employee data object. For instance, d.employees 840 includes the alias 832 for Department object 830 and association role 842 of the Department object to the Employee object, where the first name of the Employee is given a unique parameter name of "?2" 844, the value of which, for this invocation, is given as "Joe" in parameters 818. Likewise, third query segment 826 also contains items from a previously referenced data object in the query and it is used to further filter the results of the query based on attributes from the Address data object. e.address 850 includes alias 852 for the Employee object and association role 854 for the Employee object to the Address object, where the zip in the Address is given a unique parameter name of "?3" 856, which is given a value of "27560" in parameters 818.

FIG. 8C illustrates another simplified query that is functionally equivalent to SQL query 800 in FIG. 8A. Query 860 in FIG. 8C is shown to contain two query segments, 862 and 864. Like query 820 in FIG. 8B, first query segment 862 returns the rows in the Department table where the department name is "Rational".

Second query segment 864 contains items selected from a previously referenced data object in the query. d.employees 866 includes the alias 868 for Department object 870 and association role 872 of the Department object to the Employee object, where the first name of the Employee is given a unique parameter name of "?2" 874, the value of which, for this invocation, is given as "Joe" in parameters 818 in FIG. 8B.

Second query segment 864 also includes an expression from an aliased data object to a role, and to an attribute of the data object corresponding to the role. This is functionally equivalent to query segments 734 and 736 from query 720. Note that a separate query segment is not necessarily required to filter on attributes of a related data object if the data object relationship is a single valued relationship. For many valued relationships, a separate query fragment is required. e.address.zip 876 contains the alias "e" for the Employee object, the alias.role "e.address" for the Employee object to the Address object, and the (single valued role).*attribute "zip" of the Address object, where the zip is given a unique parameter name of "?3" 878, which is given a value of "27560" in parameters 818.

With the present invention, users may retrieve information from databases or other backend storage formats or persistence frameworks using the above described simplified query syntax. In one implementation, a user may create and store simplified queries using annotations. These annotations, which span multiple files, may be used in the source code itself. An example annotation usage may contain the following annotation code:

@ws.sbf-query
name="AddressesByCity"
query="[SELECT {$AddressLite} as a where a.city=?1]"

This annotation code may be used in a JAVA file and edited by an application developer. When the JAVA file is compiled, the annotation is processed. A copending application entitled "METHOD AND APPARATUS FOR INCREMENTALLY PROCESSING PROGRAM ANNOTATIONS", Ser. No. 11/002,845, filed on Dec. 2, 2004, assigned to the same assignee as the present application, and incorporated herein by reference, describes a mechanism that allows for processing program annotations and detecting added, removed, or changed annotations in source files.

Annotation processing in this example includes parsing and transforming the query to SQL, and generating the code that sends the expanded SQL to the mediator. Alternatively, code is generated that sends the simplified query syntax directly to the mediator, and the mediator understands how to transform and execute the syntax at runtime.

An additional way to implement the mechanism of the present invention is to store the query data in a meta-data descriptor file, such as an XML file, for example. The XML document is then parsed and interpreted either by an integrated development environment or a running application to read the user query. The query is then transformed to a low level query, such as SQL.

FIG. 9 is a flowchart of the process for defining queries in terms of data objects in accordance with a preferred embodiment of the present invention. The process described in FIG. 9 may be implemented in a data processing system, such as data processing system 200 in FIG. 2 and data processing system 300 in FIG. 3.

The process begins with the user defining the data object (step 902). In defining the data object, the user provides a name for the data object. Next, the user adds attribute and relationship information to the data object (step 904). This attribute and relationship information defines the shape of the data object.

When the user then defines a query in terms of the data object (step 906), the system processes the query (step 908). In processing the query, the system extracts the shape of the data object and transforms the query into a backend-specific query (step 910). The system may then execute the backend-specific query (step 912).

Thus, the present invention provides a method, apparatus, and computer instructions for defining queries in terms of data objects. The advantages of the present invention should be apparent in view of the detailed description provided above. Existing query methods define queries in terms of the backend specific syntax. However, such an approach has proven to be problematic since the query must be modified to reflect a change in the shape of a data object. In contrast, the mechanism of the present invention introduces a simplified query syntax for querying across a set of data objects which does not require the duplication of data object shape information. This simplified syntax is transformed by the system into the actual backend specific query syntax. With the present invention, modifications to the shape of a data object do not require any modifications to defined data object queries in terms of shape.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for creating a user-specified query in terms of data objects, comprising:
   receiving a user-specified query, wherein the user-specified query is a structured query language (SQL) query that is expressed in terms of a non-SQL root data object and one or more variable parameters of the non-SQL root data object;
   processing, by a computer, the user-specified query, wherein processing the user-specified query extracts, from a data object meta-model of the non-SQL root data object, attributes of the non-SQL root data object;
   transforming the user-specified query at runtime into a backend specific query, wherein the backend specific query comprises extracted attributes of the non-SQL root data object, and wherein the backend specific query is an SQL statement whose query terms are defined by substituting terms in the user-specified query with data objects from the non-SQL root data object;
   executing the backend specific query;
   annotating the user-specified query;
   obtaining at least one changed source file;
   detecting at least one annotation in the at least one changed source file, wherein the at least one annotation is changed in the at least one changed source file;
   loading, into a memory of the computer, a previously serialized state from a state location;
   recording changes of the at least one annotation in a source model of the previously serialized state, wherein an annotation recorder reconciles the recorded changes to remove a change value having a same value as an original value, thereby leaving only added, deleted and actual changed objects to form recorded changes; and
   processing, by the computer, only the recorded changes into a doclet model to form a set of incremental changes in the doclet model, wherein the set of incremental changes contains one or more changes.

2. The method of claim 1, further comprising:
   filtering query terms in the backend specific query by using additional data objects that are derived from substituted data objects from the non-SQL root data object.

3. The method of claim 1, wherein the steps of processing and transforming the user-specified query are performed by a mediator.

4. The method of claim 1, wherein the user-specified query represents a shape of the root data object, determined by the attributes and relationships of the data object meta-model.

5. The method of claim 1, wherein complex join queries are generated based on data object associations in the data object meta-model.

6. The method of claim 1, wherein union queries are generated from a set of discrete query strings to comprise a data graph of heterogeneous object roots.

7. The method of claim 1, wherein the user-specified query is located within an annotation code.

8. The method of claim 1, wherein the root data object is represented in the user-specified query as a named data object.

9. The method of claim 8, wherein the named data object is followed by an AS clause expression in the user-specified query comprising an alias of the named data object.

10. The method of claim 9, wherein a WHERE clause expression follows the alias of the named data object in the user-specified query.

11. An apparatus comprising:
   a bus;
   a storage device connected to the bus, wherein the storage device contains computer usable code;
   at least one managed device connected to the bus;
   a communications unit connected to the bus; and
   a processing unit connected to the bus, wherein the processing unit executes the computer usable code to:
   receive a user-specified query, wherein the user-specified query is a structured query language (SQL) query that is expressed in terms of a non-SQL root data object and one or more variable parameters of the non-SQL root data object;
   process, by a computer, the user-specified query, wherein processing the user-specified query extracts, from a data object meta-model of the non-SQL root data object, attributes of the non-SQL root data object;
   transform the user-specified query at runtime into a backend specific query, wherein the backend specific query comprises extracted attributes of the non-SQL root data object, and wherein the backend specific query is an SQL statement whose query terms are defined by substituting terms in the user-specified query with data objects from the non-SQL root data object;
   execute the backend specific query;
   annotate the user-specified query;
   obtain at least one changed source file;
   detect at least one annotation in the at least one changed source file, wherein the at least one annotation is changed in the at least one changed source file;
   load, into a memory of the computer, a previously serialized state from a state location;
   record changes of the at least one annotation in a source model of the previously serialized state, wherein an annotation recorder reconciles the recorded changes to remove a change value having a same value as an original value, thereby leaving only added, deleted and actual changed objects to form recorded changes; and
   process only the recorded changes into a doclet model to form a set of incremental changes in the doclet model, wherein the set of incremental changes contains one or more changes.

12. The apparatus of claim 11, wherein the user-specified query represents a shape of the root data object, determined by the attributes and relationships of the data object meta-model.

13. The apparatus of claim 11, wherein the user-specified query is located within an annotation code.

14. The apparatus of claim 11, wherein the user-specified query is defined as one of an extensible markup language or binary file format.

15. A computer program product comprising a non-transitory computer readable storage medium embodied therewith, the computer readable storage medium comprising:
   computer readable program code configured for receiving a user-specified query, wherein the user-specified query is a structured query language (SQL) query that is expressed in terms of a non-SQL root data object and one or more variable parameters of the non-SQL root data object;
   computer readable program code configured for processing the user-specified query, wherein processing the user-specified query extracts, from a data object meta-model of the non-SQL root data object, attributes of the non-SQL root data object;
   computer readable program code configured for transforming the user-specified query at runtime into a backend specific query, wherein the backend specific query comprises extracted attributes of the non-SQL root data object, and wherein the backend specific query is an SQL statement whose query terms are defined by substituting terms in the user-specified query with data objects from the non-SQL root data object;
   computer readable program code configured for executing the backend specific query;
   computer readable program code configured for annotating the user-specified query;
   computer readable program code configured for obtaining at least one changed source file;
   computer readable program code configured for detecting at least one annotation in the at least one changed source file, wherein the at least one annotation is changed in the at least one changed source file;
   computer readable program code configured for loading, into a memory of the computer, a previously serialized state from a state location;
   computer readable program code configured for recording changes of the at least one annotation in a source model of the previously serialized state, wherein an annotation recorder reconciles the recorded changes to remove a change value having a same value as an original value, thereby leaving only added, deleted and actual changed objects to form recorded changes; and
   computer readable program code configured for processing only the recorded changes into a doclet model to form a set of incremental changes in the doclet model, wherein the set of incremental changes contains one or more changes.

16. The computer program product of claim 15, wherein the user-specified query represents a shape of the root data object, determined by the attributes and relationships of the data object meta-model.

17. The computer program product of claim 15, wherein the user-specified query is located within an annotation code.

18. The computer program product of claim 15, wherein the user-specified query is defined as one of an extensible markup language or binary file format.

* * * * *